(Model.)
C. D. WALTERS.
Square and Bevel Surface Gage.
No. 236,469. Patented Jan. 11, 1881.
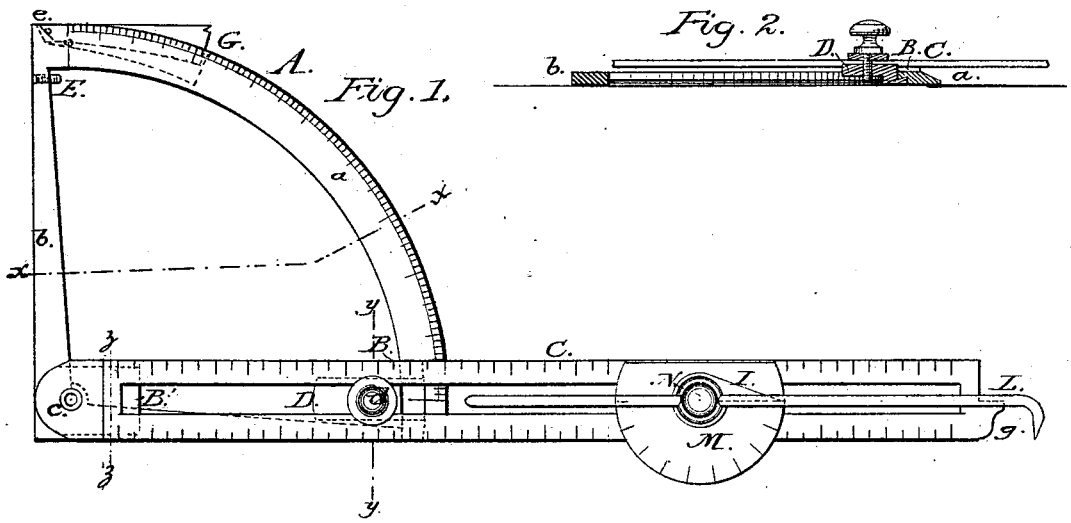
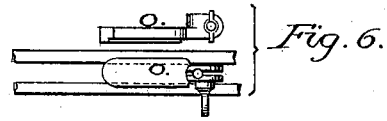
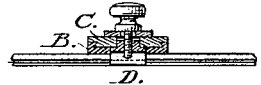
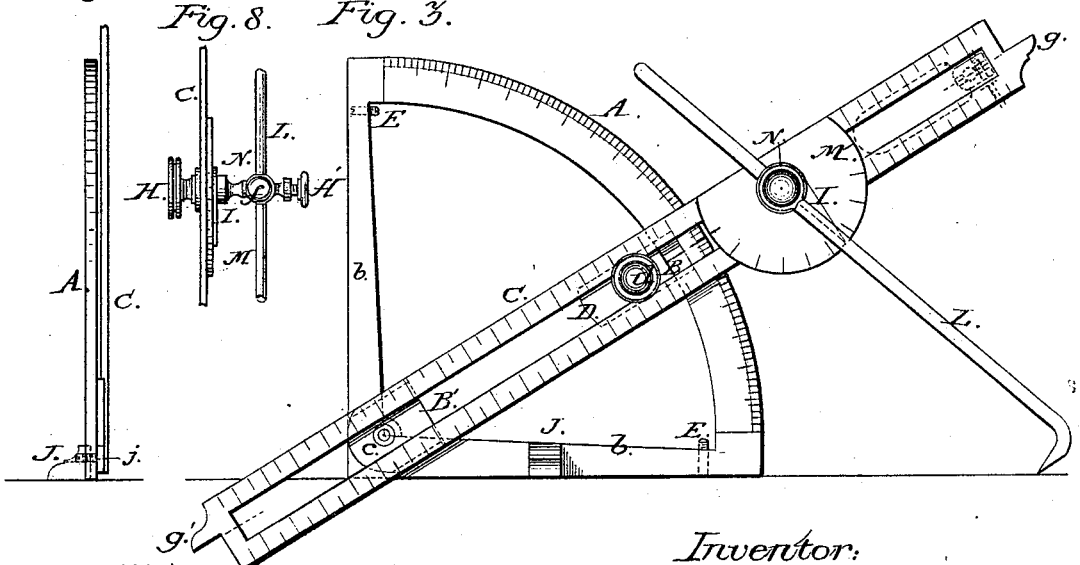
Witnesses:
I. N. Kalb
A. H. Ege
Inventor:
Charles Daniel Walters.
per Edw. W. Donn & Co.
Attys.

UNITED STATES PATENT OFFICE.

CHARLES D. WALTERS, OF HARRISBURG, ASSIGNOR OF ONE-HALF TO ALEXANDER H. EGE, OF MECHANICSBURG, PENNSYLVANIA.

SQUARE AND BEVEL SURFACE-GAGE.

SPECIFICATION forming part of Letters Patent No. 236,469, dated January 11, 1881.

Application filed September 20, 1880. (Model.)

*To all whom it may concern:*

Be it known that I, CHARLES DANIEL WALTERS, of Harrisburg, in the county of Dauphin and State of Pennsylvania, have invented certain new and useful Improvements in Square and Bevel Instruments; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is an improvement upon a patent granted to me August 10, 1880, which was entitled a "square and bevel instrument." It was composed, in the main, of a quadrantal sector pivoted at the angular intersection of the radii thereof to a blade provided with an index-pointer at one extremity, which moved freely over the graduated arc of said sector to indicate the degrees of a given or required angle.

My present invention consists, principally, of a quadrantal sector having its arc graduated into degrees and fractions thereof, a rule graduated to form a scale or scales on either edge, and a slot between the two edges of said blade extending throughout the greater part of the length of said rule, the edges of said slot being either equidistant from those of the blade or one edge coincident with the longitudinal center of said blade and the other edge indifferently located. Said rule or blade is fixed upon bearings or chairs which rest upon the flat surface of the quadrantal sector at two points, one of which chairs is pivoted at the junction of the two arms of the sector, at the point of intersection of the two radii forming the angle and subtending the arc of ninety degrees, and the other chair adjustable, as hereinafter more fully described. Moreover, said rule is also terminated at one or both ends with a convenient index or projection, as may be desired.

My invention further consists, also, in combination with said slotted rule and quadrantal sector, of a device for gaging surfaces, either metallic or otherwise, composed of a circular or segmental disk, graduated to form a protractor the center of curvature of whose graduated arc is occupied by a post provided with a suitable pointer or index, said protractor and pointer being fixed or clamped to each other and to said slotted rule by suitable clamp-screws, one of which screws may be said post. The particular construction of this gage will be more fully described and its use more fully set forth hereinafter.

Figure 1 is a plan of my combined instrument. Fig. 2 is a section of the same on line *x x* of Fig. 1. Fig. 3 is an elevation, showing the application of the surface-gage and its relation to the quadrantal sector. Fig. 4 is a section on line *z z*, Fig. 1. Fig. 5 is a section on line *y y*, Fig. 1. Fig. 6 is a plan and elevation of a simple device for carrying the pencil. Fig. 7 is an edge view of the sector, showing the foot-support when the sector is in a vertical position. Fig. 8 is an elevation, showing the clamping device for holding the graduated plate and scribe which forms a part of the surface-gage to the rule.

Referring to drawings, A is the sector, composed of an arc, *a*, and arms *b b*, placed at right angles to each other, to form with the arc *a* the quadrantal sector. These arms *b b* are more narrowed at their junctions with the said arc than at their angular connection, to enable one to read within the entire limits of the quadrant. The arc is graduated into ninety parts, representing degrees and fractions thereof.

Chairs B B' rest upon the upper surface of the sector, the latter being pivoted thereto by a perforated pivot, which passes through the metal or other material of chair B' and the angular intersection of the arms of quadrantal sector, while the other chair, B, is adjustable to and allowed to move freely in conjunction with the rule over the flat or graduated surface of the arc. Moreover, said chairs are dovetailed on the sides of their bearing surfaces to fit upon and receive corresponding dovetail-shaped grooves upon the outer edges of the graduated ruler; or, if more convenient, said dovetailed grooves of the chairs may be made to ride upon the edges or sides of the slot, in which latter case the closed ends of said slot are left open until the chairs are introduced; or, again, the under bearing-surfaces of the chairs may be rabbeted longitudinally upon the sides of the said surfaces to such a depth as may allow the central longitudinal portion of said surfaces to be interposed between the edges of the slot, and thus be made flush with the upper surface of said rule or blade C.

The ruler C is made of metal or other suitable material, with a slot extending throughout the greater part of its entire length, either centrally or with one edge of said slot coincident with the longitudinal center of the blade. Said blade C is also graduated by lines in equal divisions to represent fractions of feet, inches, or aliquot parts of any other linear units. Said ruler C is so adjusted in its bearings in the chairs B B' as to be capable of sliding therein backward and forward in the line of the direction of its length, so that a portion of it may extend at the same time on both sides of the axis of the quadrant and beyond its limits.

A holding device, D, made of a bent or otherwise wrought plate, rabbeted on its upper surface and dovetailed at one of its ends, is adapted to fit within the slot of the rule and against the dovetail groove or rabbet in the concave edge of the arc of the sector A. A thumb-screw, d, bearing upon a washer which rests against the upper surface of said rule, enters the holding device D, and when driven draws said device and clamps the quadrant and rule firmly to a given position or adjustment.

The chairs B B', as will be seen by sectional views of drawings, are made preferably of a width equal to the width of the blade or rule C, so that no obstruction will be offered to the passage of a point or scribe moved against the edge of the ruler, either within or without the open space of the sector.

Through the metal or material of both arms of the sector are inserted adjusting-screws E E, which are driven inward to the open space of the protractor, to form bearing-points to limit the movement of the rule to an exact angle of ninety degrees, should the wear of the metal or any equivalent cause arising from the use of the instrument admit of a greater or less obliquity than said exact quadrant.

Upon the outer curved edge of the sector, near the terminus of the arc, and more or less parallel to the plane of the sector A, a slot is interposed to receive a blade, G, furnished with a nail-notch at one end, said end being free to move upon an arc whose range is limited by the bearing of the other end, the latter being held in place by a rivet, e, which forms a hinge or center of articulation. Said blade G, when open to said limit, forms with the outer edge of the nearest arm of the sector, near whose extremity said blade is pivoted, an angle of ninety degrees, and hence said blade is at the same time parallel to the outer edge of the other arm.

The surface-gage attachment, to be used in connection with the sector A and rule C, is composed of a circular disk, M, or segment thereof, cut from a plate of metal or other suitable material, having its outer edge divided into equal parts, representing degrees or fractions thereof, which may be clamped to the said rule C by means of a thumb-screw, H. A pointer, I, moves over the face of this plate or dial with a movement corresponding to the movement of a scribe, L, which is fixed or clamped in the nut of the screw f by the scribe-screw H'.

When it is desirable to set the scribe to a given angle with reference to the rule C the pointer I is moved or oscillated about its axis until the line of graduation is reached which indicates the desired angle, when said rule and plate are clamped rigidly together, and with the scribe are held to the desired angle.

In order to give a firm base to the sector while a surface is being tried or gaged, I employ a foot-piece, J, which I attach to one of both flat surfaces of either arm of the sector, as may be most convenient, the plane of the sector being held in a vertical position. Said foot-piece J may be held in place upon the sector-arm by means of a dovetail-joint and firmly secured thereto, if necessary, by a screw or rivet, j.

The instrument which I claim as an improvement upon my patent previously mentioned has a broad range of adaptation in mechanics and professional use, the following, for example, being a few among many of its capabilities of application:

As a simple protractor for measuring angles, we lay the sector upon the plotting-surface with the edge of one of the arms, representing zero or ninety degrees, coincident with the base-line, already drawn. We now move the ruler C about its axis until the center m or index-line, observed through the slot, coincides with the line of graduation on the face of the arc which represents the desired angle. We next mark a point or points on said surface under the edge of the terminal projection or projections of the rule C, and, connecting said projections with a ruled line, the desired angle will have been obtained.

By the use of the sliding rule in connection with the sector great accuracy will be attained in securing a long reach, with which to form, together with the point of contact secured through the perforated pivot, the points in line.

The instrument may be used to great advantage as a parallel rule, or to serve the general purpose of two triangles. Suppose, for instance, a number of lines to represent a section are to be drawn or shown. A T-square blade being adjusted in place, we place the outer edge of one of the arms against the edge of said T-square blade and adjust the slotted rule on the protractor to the desired angle. By moving the instrument along the edge against which it bears lines may be drawn which will be exactly parallel to each other. By reversing the instrument, so that the opposite arm may bear against the edge of the T-blade, parallel lines may be drawn which will be at right angles to the former lines.

A simple ruler may be used in this application in place of a T-square.

A simple device, O, (shown in Fig. 6,) may be adapted to slide in the slot of the ruler C, said device having a hole pierced through the same to receive a pencil to be used in protracting or drawing parallel lines, or for other like purposes readily suggested to one skilled in the use of such instruments. Said device travels freely back and forth under the impulse of the operator, guided by the slot of the ruler and bearing upon the surface of the same.

The use of the instrument as a surface-gage is equally fertile in its results. This, too, will be readily affirmed by the skilled mechanic. When thus adjusted it secures the benefit of a square and a bevel, or of two bevel-angles, in the same operation without change of adjustment. This result is frequently most desirable in securing the pitch of complemental bearings in beveled cog and friction wheels, and in determining the elements of other difficult problems involved in connectional gearing in the different applications of machinery, where economy of space, material, and time are essential elements.

I claim—

1. The sector A, consisting of the quadrantal arc $a$ and arms $b\ b$, said arms being cut away at their points of juncture with said arc $a$ and provided with adjusting-screws E E, in combination with the rule C and holding device D and thumb-screw $d$, substantially as described.

2. The sector A, as described, in combination with the rule C, said rule C being held upon said sector in chairs B' B, the former of which, B', being secured to said sector A by the perforated pivot $c$, and the latter, B, resting upon the quadrantal arc $a$, is clamped to position by the holding device D and thumb-screw $d$, substantially and in the manner described.

3. The rule C, having a longitudinal slot with parallel sides the greater part of its length, and provided with projections $g\ g$ at its ends, said rule being adapted, as described, to ride freely across the sector radially, as and for the purpose set forth.

4. The rule C, slotted as described, and provided with projections $g\ g'$ at both ends, said projections having each at least one edge coincident with the longitudinal central line of said rule C, said rule C being also provided with a dovetail, or its equivalent, on its under side, adapted to fit into corresponding grooves in the chairs upon which said rule C is intended to ride.

5. The surface-gage composed of the graduated plate M, clamping device N, pointer or index I, and scribe L, the same being adapted to fit upon the rule C and operate in conjunction with the graduated sector, as and for the purpose set forth.

6. In combination with the graduated sector A, the blade G, pivoted into a slot sunk into the curved edge of the arc $a$, as described, and for the purpose substantially as set forth.

7. The carrier O, perforated as shown, for the purpose of inscribing parallel lines, and rabbeted on its under side, to ride the more surely and readily back and forth in the slot of the rule, as and for the purpose set forth, and substantially as described.

In testimony that I claim the foregoing as my own I affix my signature in presence of two witnesses.

CHARLES DANIEL WALTERS.

Witnesses:
SAML. C. WIESTLING,
H. McCORMICK.